INVENTORS.
EDWARD T.E. HURD, III
THEODORE B. BOZARTH, JR.

BY

ATTORNEY.

United States Patent Office 3,555,402
Patented Jan. 12, 1971

3,555,402
CONSTANT CURRENT TEMPERATURE STABILIZED SIGNAL CONVERTER CIRCUIT
Theodore B. Bozarth, Jr., Perkasie, Pa., and Edward T. E. Hurd III, Willingboro, N.J., assignors to Honeywell Inc., Minnneapolis, Minn., a corporation of Delaware
Filed Dec. 18, 1968, Ser. No. 784,587
Int. Cl. G05f 1/58; H02j 1/04
U.S. Cl. 323—4
6 Claims

ABSTRACT OF THE DISCLOSURE

A differential amplifier is disclosed wherein a constant-current source is provided which is referred only to the power-supply leads. From the constant-current source, bias signals are derived which, in turn, provide and control constant-current supply means for each of the two legs of the differential amplifier, individually. This arrangement provides a highly stable, highly accurate amplification of input signals and minimizes errors due to ambient temperature changes.

---

The present invention relates to electrical apparatus and more particularly to electronic signal transducing amplifiers.

In the art of industrial process control instrumentations, particularly under the more refined and sophisticated systems of today, need has arisen for a signal transducer which is capable of converting an input signal in one form to an output signal in another form or to convert an input signal in the same form but in a different range of magnitudes.

While apparatus of this general type has been provided, heretofore, it is an object of the present invention to provide an improved signal transducer.

It is an another object of the invention to provide an improved transducer which features a high order of stability of operation with respect to changing ambient temperature.

It is a further object of the present invention to provide a transducer which faithfully and accurately transduces the input signal.

It is yet another object of the present invention to provide an improved signal transducer which exhibits considerable versatility in transducing of the signals involved.

In accomplishing these and other objects, there has been provided, in accordance with the present invention, a signal transducer which comprises, basically, a differential amplifier wherein the input signal is applied to one of the input terminals and a balancing feedback signal is applied to the other of the input terminals. Means are provided for applying a self-compensating constant current supply to each of the two legs of the differential amplifiers whereby to null the tendency of the amplifier to drift with temperature variations. The resultant output of the differential amplifier is used to control the current flowing in an output circuit. The feedback signal is derived from the current flowing in the output circuit.

Figure 1:
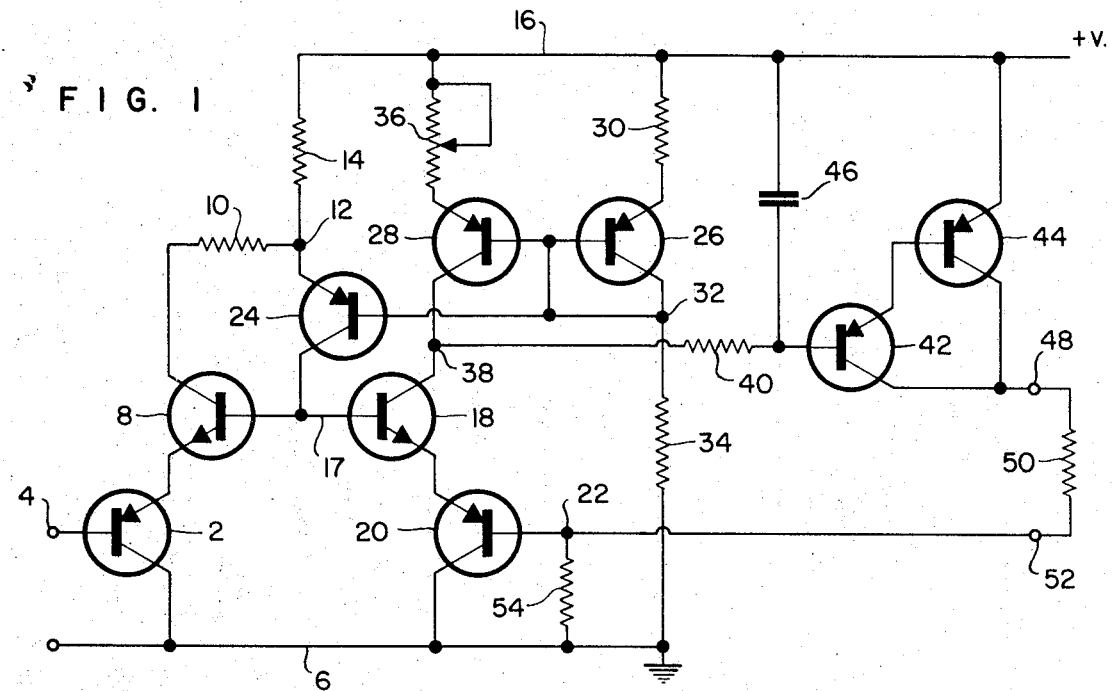
Figure 2:
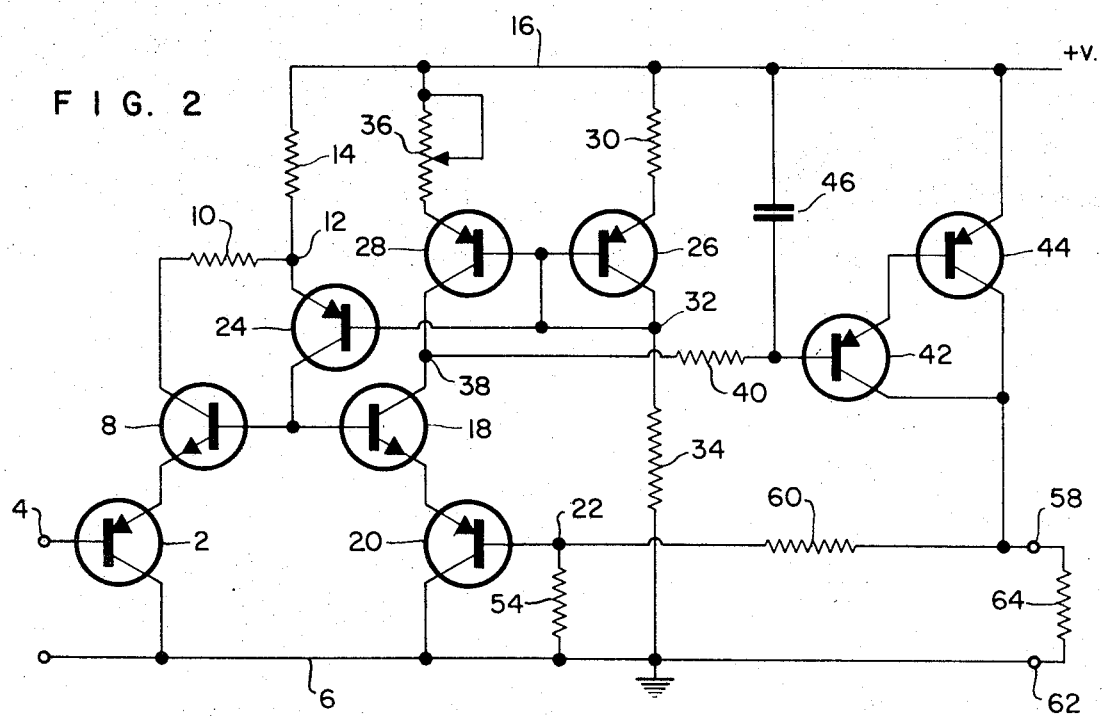

A better understanding of the present invention may be had from the following detailed description when read in connection with the accompanying drawings in which:

FIG. 1 is a schematic circuit diagram of a signal transducer embodying the present invention; and FIG. 2 is a schematic circuit diagram of the transducer shown in FIG. 1 but arranged to accommodate a different form of output signal.

Referring now to the drawings in more detail, there is shown in FIG. 1 a transistor amplifier which features a differential amplifier input section. The amplifier includes an input transistor 2 having a base, emitter, and collector electrodes. The base electrode of the transistor 2 is connected to an input terminal 4. The collector of the transistor 2 is connected to a common lead or bus 6 which, in turn, may be connected to the negative power supply or ground, i.e. a point of fixed reference potential. The emitter of the transistor 2 is connected to the emitter of a transistor 8. The transistor 8 is also supplied with a base emitter and collector electrodes. It should be noted that the transistor 2 and the transistor 8 are of opposite conductivity type; the transistor 2 being illustrated as a PNP ransistor while the transistor 8 is an NPN transistor. The collector of the transistor 8 is connected through a first resistor 10 to a junction point 12. The junction 12 is connected through a resistor 14 to the positive power supply lead or bus 16.

The base of the transistor 8 is directly connected to the base of a similar transistor 18. The transistor 18, in addition to the base electrode is also provided with an emitter and a collector electrode. The emitter electrode of the transistor 18 is directly connected to the emitter of a further transistor 20, which also includes a base electrode and a collector electrode. Whereas the transistor 18 was of the same conductivity type as the transistor 8, the transistors 2 and 20 are of the same conductivity type with respect to each other but are of opposite conductivity type with respect to transistors 8 and 18. Thus, in the illustrative embodiment, transistor 18 is an NPN transistor and a transistor 20 is a PNP transistor. The collector of the transistor 20 is directly connected to the common lead 6. The base of the transistor 20 is connected to a junction 22, about which more will be said hereinafter.

The transistor 24 is provided with base, emitter, and collector electrodes. The emitter of the transistor 24 is connected to the junction 12 between the resistors 10 and 14. The collector of the transistor 24 is connected to the lead 17 connecting the bases of the two transistors 8 and 18.

A constant current supply network is provided which includes a transistor 26 and a transistor 28. Each of these transistors 26 and 28 is provided with a base electrode, an emitter electrode, and a collector electrode. The emitter electrode of the transistor 26 is connected through a resistor 30 to the positive power supply lead 16. The collector of the transistor 26 is connected to a junction 32, thence, through a resistor 34 to the ground or common lead 6. The emitter of the transistor 28 is connected through an adjustable resistor 36 to the positive power supply lead 16. The collector of the transistor 28 is directly connected to the collector of the transistor 18. The base of the transistor 28 is directly connected to the base of transistor 26 and both are directly connected to the junction 32. The base of the transistor 24 is also directly connected to the junction 32.

The junction 38 is connected through a resistor 40 to the base electrode of a transistor 42; the transistor 42 being the first transistor of a Darlington pair. A transistor 44 comprises the second transistor of the Darlington pair. The base electrode of the transistor 42 is also connected through a capacitor 46 to the positive power supply lead 16.

The collector electrodes of the two transistors 42 and 44 are connected together and to a first output terminal 48. A resistor 50, representing an output load device, is connected between the output terminal 48 and a second output terminal 52. The output terminal 52 is directly connected to the previously mentioned junction 22. A feedback resistor 54 is connected between the junction 22 and the common lead 6, or ground.

Before discussing the dynamic or signal responsive operation of the circuit, the stable bias conditions will be described. The combination of the resistor 30, the transistor 26 and the resistor 34, connected across the power supply leads 6 and 16, constitute a constant current means. The current in this branch may be predetermined by the parameters of the three elements and the magnitude of the power supply voltage. The constant current in this branch of the circuit is not effected by signal conditions which may be operating at other points in the circuit. Accordingly, this constant current may be used as a means for establishing controlled bias voltages for other operating portions of the circuit.

Accordingly, the voltage established at the junction 32 is applied as control bias to the base electrodes of the transistors 24 and 28, as well as self-biasing the transistor 26. With these bias voltages clamped at the value established at the junction 32, the current through the resistor 36 and transistor 28 must be constant. Similarly, the current through the resistor 14 and the transistor 24 must also be constant. It can be shown that the voltage across the resistor 36 must be substantially equal to the voltage across the resistor 30. Similarly, the voltage across the resistor 14 must also be substantially equal to the voltage across the resistor 30. Since these voltages must be equal, the constant currents flowing through these resistors must be of such magnitude as to maintain that voltage. Accordingly, the value of the resistors may be so chosen as to produce constant current flow in each of the legs which is of a predetermined magnitude.

The current flowing through the leg including the transistor 28 and the resistor 36, also flows, serially, through the transistors 18 and 20. Substantially all of the current flowing through the resistor 14 also flows, serially, through the resistor 10 and the transistors 2 and 8. A very small portion of the current through the resistor 14 also flows through the transistor 24, as will be discussed in more detail hereinafter.

The transistors 2 and 8 comprise, in effect, one half and the transistors 18 and 20 comprise the other half of a circuit combination which is, in essence, a differential amplifier. The feedback signal, as will be shown later, is applied across the feedback resistor 54 and to the base of the transistor 20 as an input signal to the second leg of the differential amplifier. If there is no error or zero-shift in the circuit, the voltage applied as feedback to the base of the transistor 20 should be exactly equal to the voltage signal applied to the base of the transistor 2 as an input signal to the first leg of the differential amplifier. Essentially, the only parameters which would tend to prevent such a relationship from being established is the internal parameters of the four transistors themselves, known as the $V_{BE}$ drop in each. This is a voltage drop that occurs across the base-emitter junctions of transistors and is a function of the emitter current flowing in each transistor. It has been established that the currents, i.e. the emitter currents flowing in each of the two halves of the differential amplifiers are constant. That constant current in one of the two halves, that including the transistors 18 and 20, is adjustable by virtue of the adjustability of the resistor 36. This constitutes a "zero" adjustment. By adjusting the resistor 36, and thereby the current flowing through the transistors 18 and 20, the sum of the $V_{BE}$ drops in the transistors 18 and 20 can be made equal to the sum of the $V_{BE}$ drops in the transistors 2 and 8. With these two $V_{BE}$ drop sums equal and the currents in the two halves constant, there is no signal offset, and the feedback signal applied to the base of the transistor 20 will be substantially equal to the input signal applied to the base of the transistor 2.

Since the currents in the two halves of the differential amplifier, once established, is constant, even a change in the temperature of the transistors—usually detrimental to transistor operation—is ineffective to upset the balance of the circuit. However, in order to further avoid a zero shift due to the effect of temperature change on the $V_{BE}$ drop in the transistors 8 and 18, a local feedback loop is provided. This loop includes the resistor 10 connected between the collector of the transistor 8 and the junction 12.

If, for example, the temperature were to change in a direction to tend to increase the gain characteristic of the transistor 18, this would tend to increase the emitter-collector current through that transistor. However, that current is held at a constant value as hereinbefore described. Further, the voltage at the emitter of the transistor 18 is clamped at a level determined by the $V_{BE}$ drop of the transistor 20 plus the feedback voltage developed across the resistor 54 above reference or ground. Accordingly, the temperature induced gain change can only be reflected as tending to reduce the base current of the transistor 18. Such a reduction in base current of the transistor 18 would tend to cause an increase in the base current of the transistor 8. Further, the gain of the transistor 8 will also be increased by the temperature change. Together, these changes would tend to cause a significant increase in the collector emitter current of the transistors 8 and 2. If that were allowed to occur, the $V_{BE}$ drops of the transistors 8 and 2 would change, producing an undesirable zero-shift. However, it will be remembered that the total current through the resistor 14 remains constant. Accordingly, if and as soon as a change in the current through the transistors 8 and 2 begins, a complementary change occurs in the current through the transistor 24 since the sum of these currents must remain constant. Thus, the reduction in the current flow through the transistor 24 is in a direction and of a magnitude to compensate for the tendency of the emitter currents in the transistors 8 and 2 to change. Temperature changes, therefore do not upset the balance of the amplifier which would tend to cause a zero-shift.

Now let it be assumed that a signal is applied to the input terminals 4. Because of the configuration of the circuitry, substantially the entire input signal change is reflected at the base electrode of the transistor 8, and, consequently, at the base of the transistor 18. Assuming an increased signal, the increased signal causes an increased flow of current through the transistors 18 and 20. Since the current applied to those two transistors from the transistor 28 and the resistor 36 is constant, the increased current must come from the power supply lead 16 through the base-emitter paths of the transistors 42 and 44. This, in turn, causes a corresponding increase in the current flow in the emitter-collector paths of the Darlington pairs 42 and 44. That latter increase in current flow passes through the load circuit 50 and the feedback resistor 54. Initially, when the signal appears at the base of the transistor 18, the transistors 18 and 20 are turned "on" hard. However, as soon as the increased current flow through the Darlington pair is passed through the feedback resistor 54, there appears a voltage signal at the base of the transistor 20 which is in a direction to reduce the current flow through the transistors 18 and 20. The voltage signal applied as input (feedback) signal at the base of the transistor 20, at the junction 22, will be almost exactly equal in magnitude to the signal applied as input signal to the terminal 4 and the base of the transistor 2. The difference between the two will be only that difference necessary to produce the required current flow through the feedback resistor 54 to maintain the voltage signal thereacross at the desired level. Inasmuch as the gain of the Darlington pair, transistors 42 and 44 is very high, the current flow through the transistors 18 and 20 is only very slightly different from that previously described for the "zero" condition, an amount not sufficient to produce a significant change in the $V_{BE}$ drops thereof, and, consequently, no zero-shift with signal.

Notwithstanding the very small change in the current in the transistors 18 and 20, there will be produced a faithful and significant signal through the load circuit 50. In one transducer, constructed in accordance with the present invention, the input circuit was designed to accept input signal in the range from 1 to 5 volts DC. By properly selecting the value of the feedback resistor, the output signal was a current signal which, with a feedback resistor of one value, was in the range of 1 to 5 ma. With feedback resistors of different values, the output signal was adjusted to fit a range of 4 to 20 ma. and, again, a range of 10 to 50 ma. It will, of course, be appreciated that since the range of the output signal is determined by the value of the feedback resistor, it is important that the resistor be of a type which is not sensitive to temperature change.

While it was observed that the circuit constructed in accordance with the present invention was designed to accept an input signal in the range of 1 to 5 volts, it should be noted that that input range was established by the nature of the desired output signal. The circuit, itself is, because of the unique construction, capable of accepting an input signal down to zero volts and producing a linearly responsive signal at the output. Similarly, the input signal may be as large in magnitude as to approach 75 to 80% of the supply voltage on the bus 16, and still produce a linearly responsive output signal.

In FIG. 2, there is shown a substantially identical circuit but having the output circuit arranged to produce an output voltage signal instead of a current signal as in the circuit of FIG. 1. Here the elements of the circuit are the same and function in the same manner as in the circuit of FIG. 1. Here, however, the collector electrodes of the Darlington pair 42 and 44 are connected together and to an output terminal 58. The output terminal 58 is connected through a series resistor 60 to the junction 22 at the base of the transistor 20. As before the feedback resistor 54 is connected between the junction 22 and the reference, or ground, lead 6. A second output terminal 62 is connected directly to the reference, or ground, lead 6. An output load device is represented by a resistor 64 connected across the output terminals.

In this configuration the emitter-collector current of the Darlington pair flows through the lead 64 in parallel with the feedback circuit, instead of in series therewith as in FIG. 1. As before, the stable condition obtains when the voltage across the feedback resistor 54 is substantially equal to the input voltage and thereby determines the amount of current necessary to be drawn through the series combination of the resistors 60 and 54. It will be apparent that the output voltage appearing across the output terminals 58 and 62, and, hence, across the load 64 will be equal to the sum of the voltages developed across the two resistors 60 and 54. If it is desired that the signal transducer herein described be a unity gain isolating amplifier, then it is apparent, now, that the resistor 60 may have zero value or be of an insignificantly small value relative to the value of the resistor 54 that the potential at the output terminal is substantially equal to that at junction 22, hence, to that at the input terminal 4. On the other hand, if it is desired that the output voltage be significantly larger than that of the input signal, then the desired ratio of input to output can be accomplished by selecting the value of the resistor 60 which, in combination with the feedback resistor 54 produces the desired proportionality factor.

Thus there has been provided in accordance with the present invention, an improved signal transducing amplifier which features a high order of stability under changing conditions of ambient temperature and maintains a high order of accuracy in the relationship of output signal to input signal.

The embodiments of the invention in which an exclusive property or privilege is claimed are defined as follows:

1. A signal transducer comprising a differential amplifier having a first leg and a second leg;
    a power supply bus means for connection to a power source;
    constant-current control means connected to said power supply bus means and to said first and second leg for establishing a constant-current supply for each of said first leg and second leg of said differential amplifier;
    input means connected to said first leg for applying input signals to said differential amplifier;
    an output amplifier;
    means connecting the input of said output amplifier to said second leg of said differential amplifier whereby to control said output amplifier in accordance with signals corresponding to said input signals;
    output circuit means connected to said output amplifier for developing an output signal controlled by the operation of said output amplifier;
    means for deriving a feedback signal proportional to said output signal; and
    means for applying said feedback signal as input signal to said second leg of said differential amplifier.

2. The invention as set forth in claim 1 wherein each leg of said differential amplifier comprises:
    a first transistor of a first conductivity type and a second transistor of the opposite conductivity type;
    the emitter of said first transistor being connected to the emitter of said second transistor, the collector of both of said first transistors being connected to a point of reference potential, the collector of each of said second transistors being connected individually to said constant current means;
    the base electrodes of both of said second transistors being connected together and to said constant current means;
    said input means being connected to the base electrode of said first transistor in said first leg,
    said feedback signal being applied to the base electrode of said first transistor of said second leg, and
    said input of said output amplifier being connected to the collector electrode of said second transistor of said second leg.

3. The invention as set forth in claim 2 wherein said second constant current control means comprises
    a first constant current transistor having an emitter, a collector and a base electrode,
    a first resistor connected between said emitter of said first constant current transistor and said power supply bus means,
    a second resistor connected between said collector of said first constant current transistor and said point of reference potential,
    said base electrode being directly connected to said collector whereby to establish a constant bias potential at said collector,
    a second constant current transistor having an emitter, a collector and a base electrode,
    an adjustable current determining resistor connected between said emitter of said second constant current transistor and said power supply bus means,
    said collector of said second constant current transistor being connected to said collector of said second transistor of said second leg of said differential amplifier,
    said base electrode of said second constant current transistor being connected to said collector of said first constant current transistor whereby to provide an adjustable constant current through said second leg of said differential amplifier,
    a third constant current transistor having an emitter, a collector and a base electrode,
    a current determining resistor connected between said emitter of said third constant current transistor and said power supply bus means,
    said base electrode of said third constant current transistor being connected to said collector of said first constant current transistor,
    a resistor connected between the emitter of said third transistor and the collector of said second transistor of said first leg of said differential amplifier whereby to provide a constant current through said first leg; and said collector of said third transistor being connected to the junction between the base electrodes of said second transistors of said first and second leg whereby to provide a self balancing bias supply for said first and second leg.

4. A differential amplifier having a first leg and a second leg,
- a power supply bus means for connection to a power source,
- constant current control means connected to said power supply bus means including means defining a first and a second constant current path,
- means connecting said constant current control means individually to each of said first and second leg, respectively, for establishing a constant current supply for each of said legs of said differential amplifier,
- each of said legs of said differential amplifier having signal input control means, and
- signal output means connected to one of said legs.

5. A differential amplifier as set forth in claim 4 wherein each leg of said differential amplifier comprises
- a first transistor of a first conductivity type and a second transistor of the opposite conductivity type,
- the emitter of said first transistor being connected to the emitter of said second transistor, the collector of both of said first transistors being connected to a point of reference potential, the collector of each of said second transistors being connected individually to said constant current means, the base electrodes of both of said second transistors being connected together and to said constant current means;
- said signal input means being connected to the base electrode of each of said first transistors.

6. A differential amplifier having a first leg and a second leg,
- a power supply bus means for connection to a power source,
- constant current control means connected to said power supply bus means,
- means connecting said constant current control means individually to each of said first and second leg for establishing a constant current supply for each of said legs of said differential amplifier,
- each of said legs of said differential amplifier having signal input control means,
- signal output means connected to one of said legs,
- said constant-current control means including
- a first constant current channel connected between said power supply bus means and a point of reference potential, said channel including means defining a constant bias reference voltage;
- a second constant-current channel, responsive to said bias reference voltage connected between said power supply bus means and said second leg of said differential amplifier whereby to provide a constant current through said second leg; and
- a third constant-current channel, responsive to said bias reference voltage connected between said power supply bus means and said first leg of said differential whereby to provide a constant current through said first leg.

References Cited
UNITED STATES PATENTS

| | | |
|---|---|---|
| 3,194,985 | 7/1965 | Smith, Jr. et al. |
| 3,262,066 | 7/1966 | Trilling _____ 330—30(D)X |
| 3,310,688 | 3/1967 | Ditkofsky. |
| 3,461,397 | 8/1969 | Cunningham _____ 330—30(D) |

J D MILLER, Primary Examiner

G. GOLDBERG, Assistant Examiner

U.S. Cl. X.R.
323—22; 330—30